(12) United States Patent
Emaru

(10) Patent No.: US 10,949,323 B2
(45) Date of Patent: Mar. 16, 2021

(54) APPLICATION MANAGEMENT SYSTEM, METHOD, AND COMPUTER PROGRAM

(71) Applicant: Hitachi, Ltd., Tokyo (JP)

(72) Inventor: Hironori Emaru, Tokyo (JP)

(73) Assignee: HITACHI, LTD., Tokyo (JP)

( * ) Notice: Subject to any disclaimer, the term of this patent is extended or adjusted under 35 U.S.C. 154(b) by 249 days.

(21) Appl. No.: 16/090,765

(22) PCT Filed: Aug. 26, 2016

(86) PCT No.: PCT/JP2016/075027
§ 371 (c)(1),
(2) Date: Oct. 2, 2018

(87) PCT Pub. No.: WO2018/037561
PCT Pub. Date: Mar. 1, 2018

(65) Prior Publication Data
US 2020/0327035 A1  Oct. 15, 2020

(51) Int. Cl.
*G06F 9/445* (2018.01)
*G06F 11/34* (2006.01)
*G06F 8/60* (2018.01)
*G06F 8/71* (2018.01)
*G06F 9/54* (2006.01)
*G06F 11/30* (2006.01)

(52) U.S. Cl.
CPC ............ *G06F 11/3476* (2013.01); *G06F 8/60* (2013.01); *G06F 8/71* (2013.01); *G06F 9/542* (2013.01); *G06F 11/302* (2013.01)

(58) Field of Classification Search
CPC .......... G06F 11/3476; G06F 8/60; G06F 8/71; G06F 9/542; G06F 11/302
USPC .................................................. 717/168–178
See application file for complete search history.

(56) References Cited

U.S. PATENT DOCUMENTS 10,289,407 B1 *  5/2019  Turner .................. G06F 9/3844
2014/0282422 A1    9/2014  Tuffs et al.

* cited by examiner

*Primary Examiner* — Chuck O Kendall
(74) *Attorney, Agent, or Firm* — Procopio, Cory, Hargreaves & Savitch LLP

(57) ABSTRACT

A problem to be addressed by the present invention is that, when a version update of an application has been carried out, it has not been possible to ascertain which metrics are affected. Provided is an application management system, comprising: a monitoring program 1600, which measures a plurality of metric types in a plurality of different environments; a deployment program 1500 which deploys a first version and a second version of an application; and an analysis program which, on the basis of measurement values of the plurality of metric types in environments in which the first version and the second version of the application respectively operate, determine a metric type in which a difference occurs between the first version and the second version.

18 Claims, 10 Drawing Sheets

Fig. 6

| Application | Version | Deployment destination |
|---|---|---|
| Application A | Ver. 1 | 192.168.1.1<br>192.168.1.2<br>192.168.1.3<br>192.168.1.4 |
| Application A | Ver. 2 | 192.168.1.5<br>192.168.1.6 |
| Application B | Ver. 25 | 192.168.10.1<br>192.168.10.2<br>192.168.10.4<br>192.168.10.5 |
| Application C | Ver. 5.0 | 192.168.5.5<br>192.168.5.6 |
| Application C | Ver. 5.1 | 192.168.6.1<br>192.168.6.2 |
| ⋮ | ⋮ | ⋮ |

Fig. 7

| Acquisition source | Type | 2/10 9:30 | ... | 2/10 9:42 |
|---|---|---|---|---|
| 192.168.1.1 | CPU usage | 60 | ... | 53 |
| 192.168.1.1 | Memory usage | 128 | ... | 25 |
| 192.168.1.1 | Transaction rate | 525 | ... | 126 |
| 192.168.1.1 | Latency (Min) | 60 | ... | 25 |
| 192.168.1.1 | Latency (Ave) | 45 | ... | 40 |
| 192.168.1.1 | Latency (Max) | 961 | ... | 389 |
| 192.168.1.1 | Network usage | 13 | ... | 21 |
| 192.168.1.1 | IOPS (Read) | 74 | ... | 68 |
| 192.168.1.1 | IOPS (Write) | 21 | ... | 37 |
| 192.168.1.1 | Disk usage | 625 | ... | 728 |
| 192.168.1.1 | Cache hit rate | 72 | ... | 89 |
| : | : | : | : | : |

Fig. 8

| Application | Version | Deployment destination |
|---|---|---|
| Application A | Ver. 1 | 192.168.1.1<br>192.168.1.2<br>192.168.1.3<br>192.168.1.4 |
| Application A | Ver. 2 | 192.168.1.5<br>192.168.1.6 |
| Application B | Ver. 25<br>Feature A=off | 192.168.10.1<br>192.168.10.2 |
| Application B | Ver. 25<br>Feature A=on | 192.168.10.4<br>192.168.10.5 |
| Application C | Ver. 5.0 | 192.168.5.5<br>192.168.5.6 |
| Application C | Ver. 5.1 | 192.168.6.1<br>192.168.6.2 |
| ⋮ | ⋮ | ⋮ |

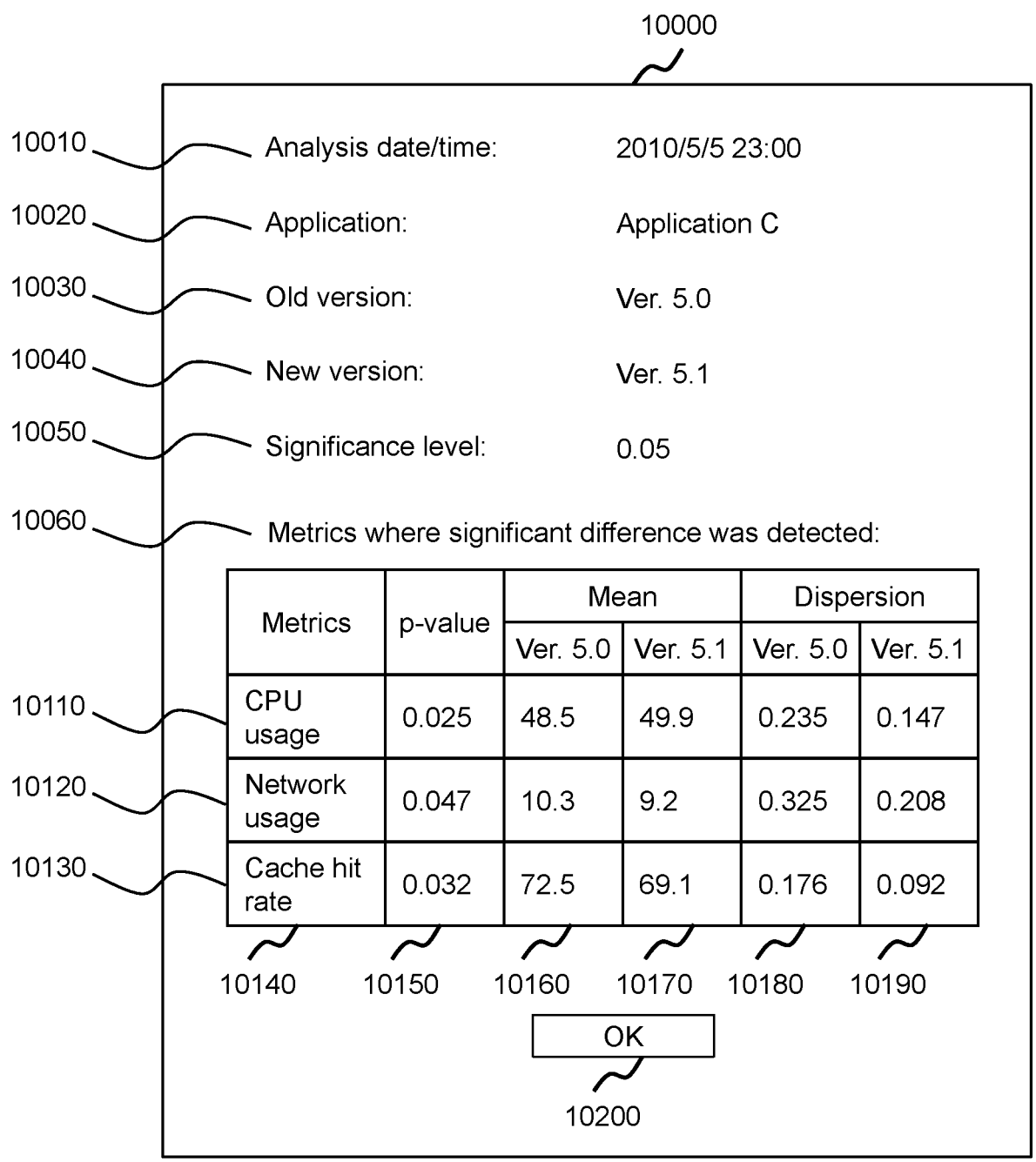

US 10,949,323 B2

APPLICATION MANAGEMENT SYSTEM, METHOD, AND COMPUTER PROGRAM

CROSS-REFERENCE TO RELATED APPLICATIONS

This application is a U.S. National Stage entry of PCT Application No: PCT/JP2016/075027 filed Aug. 26, 2016, the contents of which are incorporated herein by reference.

TECHNICAL FIELD

The present invention relates to a method for monitoring application updated frequently.

BACKGROUND ART

With the spread of DevOps, deployment of applications as frequent as 10 times or more a day which was conventionally difficult has now been practical.

PTL 1 discloses a method called a canary test in which assuming a scale-out configuration where a plurality of applications of the same version is deployed, some of a plurality of deployed instances are replaced with a new version and some of requests are distributed to the new version of instances by load-balancing. In this literature, a new version of instances is referred to as canary instance, and means for calculating relative performance values between the baseline of the metrics acquired from instances on which an original application is operating and the metrics acquired from canary instance and displaying the calculated relative performance values in a graphical form to thereby evaluate the advantageous effects of the program of the new version.

CITATION LIST

Patent Literature

[PTL 1]
U.S. Patent Application Publication No. 2014/0282422

SUMMARY OF INVENTION

Technical Problem

A system administrator needs to review threshold changes in related metrics (performance information) and alert settings according to highly frequent changes in application. Furthermore, the administrator needs to provide a feedback for advantageous effects and adverse effects of the deployed new version of application to an application developer (a developer). In order to provide the feedback, it is necessary to ascertain which metrics are affected by a version update of the application.

However, since there are numerous metric types to be monitored, it is even difficult for developers to determine metrics which are likely to be affected by changes in an application in advance.

Solution to Problem

An application management system according to an embodiment of the present invention includes a processor and a storage device and monitors an application operating on a computer. The storage device stores measurement values of a plurality of metric types in a plurality of different environments, as measured by a monitoring process and a state after deployment in which a first version and a second version of the application are deployed by a deployment process. The processor performs an analysis process of determining a metric type in which a difference occurs between the first version and the second version on the basis of the measurement values of the plurality of metric types in environments in which the first version and the second version of the application operate.

Advantageous Effects of Invention

According to the present invention, it is possible to extract metrics which are affected by changes in an application's version from numerous metrics.

BRIEF DESCRIPTION OF DRAWINGS

FIG. 6 is a diagram illustrating a configuration of a deployment management table 6000 stored in a storage medium 2250 of a management computer system 2100A according to an embodiment of the present invention.

FIG. 7 is a diagram illustrating a configuration of a metric table 7000 stored in a storage medium 2250 of a management computer system 2100B according to an embodiment of the present invention.

FIG. 8 is a diagram illustrating a configuration of an application management table 8000 stored in a storage medium 2250 of a management computer system 2100C according to an embodiment of the present invention.

FIG. 10 is an analysis result display GUI that the analysis program 1700 displays in the computer system 2100C according to an embodiment of the present invention.

DESCRIPTION OF EMBODIMENTS

Figure 1:
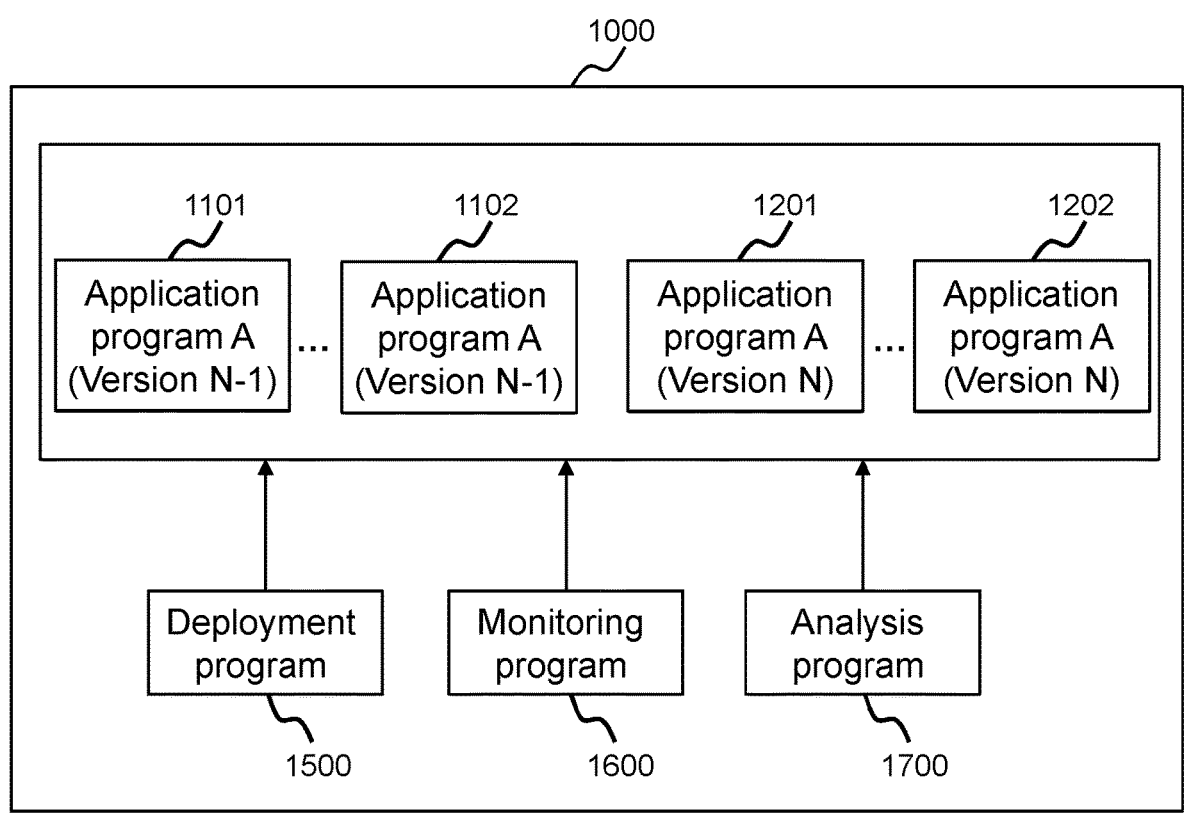
FIG. 1 is a diagram illustrating a logical configuration of an IT system according to an embodiment of the present invention.

The embodiments described below are not intended to limit the inventions according to the claims, and all elements and combinations thereof described in the embodiments are not necessarily essential to the solving means for the invention. In these drawings, the same reference numerals throughout a plurality of drawings indicate the same constituent elements. In the following description, although pieces of information in the present invention is described using an expression of an "aaa table" or the like, these pieces of information may be expressed by expressions other than a data structure such as a table. Due to this, the "aaa table" or the like is sometimes referred to as "aaa information" in order to indicate that the information does not depend on a data structure. Moreover, although expressions such as "identification information", "identifier", "name", or "ID" are used to describe the content of each piece of information, these expressions can be replaced with each other.

In the following description, there may be cases where processing is described using a "program" as the subject. However, since predetermined processing is performed using a memory and a communication port (a communication device, a management I/F, and a data I/F) when the program is executed by a processor, the processor may be used as the subject of the processing. Moreover, processing described using a program as the subject may be the processing performed by a computer such as a management server and an information processing apparatus. Moreover, a part or an entire portion of the program may be realized by dedicated hardware. Moreover, various programs may be installed on respective computers by a program distribution server or a computer-readable storage medium. Furthermore, various programs may be executed on a virtualization environment such as a hypervisor-type or a container-type virtualization environment.

Hereinafter, an embodiment of the present invention will be described with reference to the drawings.

FIG. 1 is a diagram illustrating a logical configuration of an IT system 1000 according to the present embodiment.

The IT system 1000 of the embodiment is realized by a plurality of programs operating on predetermined hardware. A plurality of application programs of different versions (for example, version N and version N–1) simultaneously operates on the IT system 1000. For example, application programs 1101 and 1102 are instances of an Application A of the version N–1 (a first version). Application programs 1201 and 1202 are instances of the Application A of the version N (a second version). In the present embodiment, a plurality of instances operates on each version. However, one or more instances may operate on each version. Although two versions are present in the present embodiment, three or more versions may be present.

In the present embodiment, application programs A of the same type are deployed. However, applications of two or more types may be deployed.

A deployment program 1500 is a program that deploys application programs. In the present embodiment, one deployment program operates on the IT system 1000. However, a plurality of deployment programs may operate on the IT system 1000.

A monitoring program 1600 is a program that monitors the IT system and collects measurement values of metrics which are monitoring results. In the present embodiment, one monitoring program operates on the IT system 1000. However, a plurality of monitoring programs may operate on the IT system 1000. In this case, a plurality of monitoring programs may measure different metrics. A plurality of monitoring programs may measure metrics for different applications. A plurality of monitoring programs may measure metrics of different locations.

A analysis program 1700 is a program that analyzes measurement values of the metrics collected by the monitoring program 1600 to extract types of metrics in which a difference occurs in the measurement values due to a difference in an application's version. In the present embodiment, one analysis program operates. However, a plurality of analysis programs may operate. In this case, a plurality of analysis programs may analyze different applications.

Figure 2:
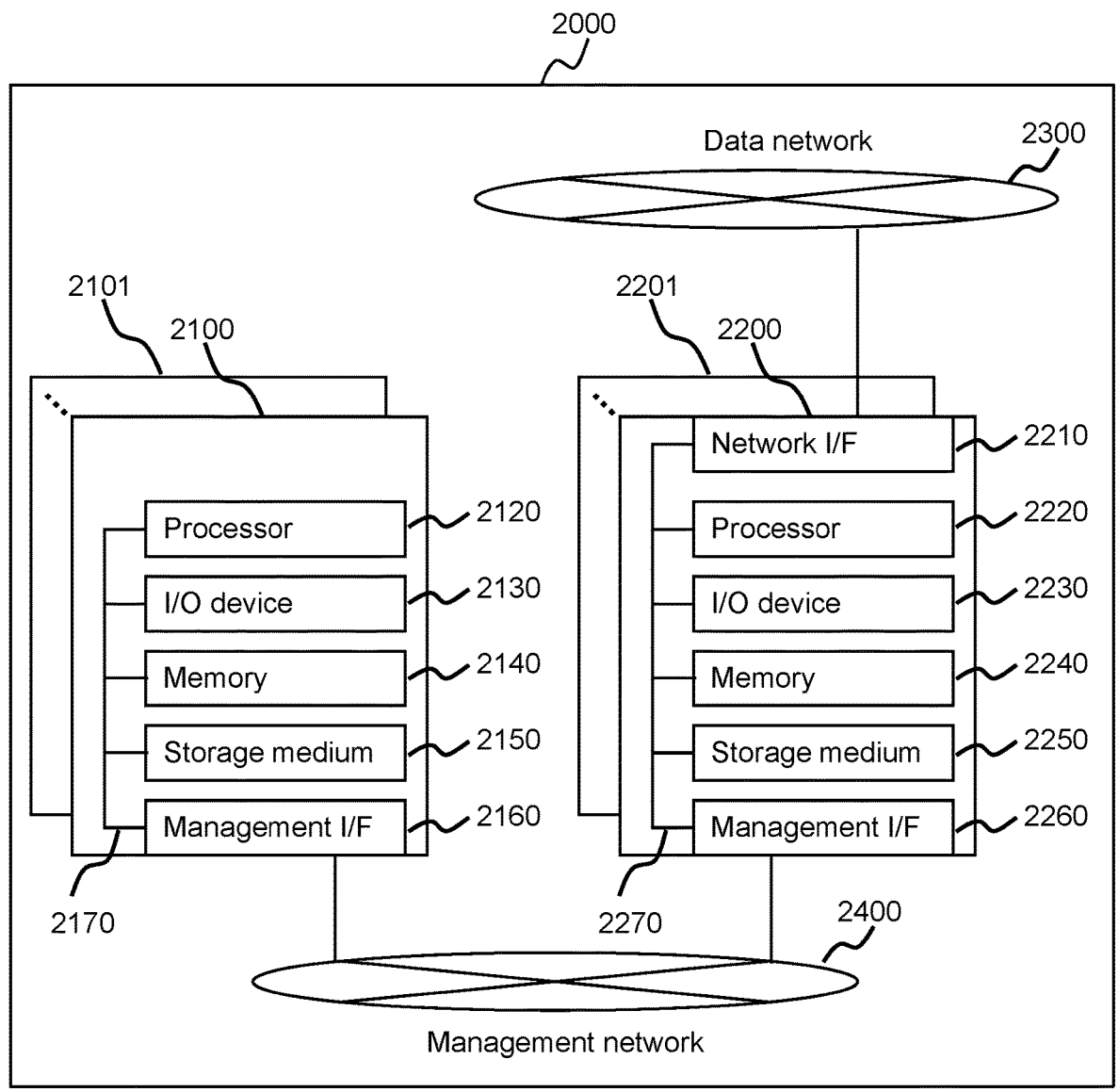
FIG. 2 is a diagram illustrating a physical configuration of an IT system according to an embodiment of the present invention.

FIG. 2 is a diagram illustrating a physical configuration 2000 of the IT system 1000 according to the embodiment of the present invention.

The IT system 1000 of the embodiment includes one or more computer systems 2200 and 2210, one or more management computer systems 2100 and 2101, a data network 2300, and a management network 2400. The numbers of computer systems 2200 and 2210 and management computer systems 2100 and 2101 are not particularly limited as long as the numbers are one or more. Although the computer systems 2200 and 2210 and the management computer systems 2100 and 2101 are computer systems of different types, the computer system and the management computer systems may be computer systems of the same type.

The computer system 2200 includes a network I/F 2210, a processor 2220, an input/output (I/O) device 2230, a memory 2240, a storage medium 2250, a management I/F 2260, and an internal network 2270. The network I/F 2210 is an I/F with the data network 2300. The I/O device 2230 may be a device that accepts input and output of users such as a keyboard, a mouse, or a display. The management I/F 2260 is an I/F with the management network 2400. The internal network 2270 is a network that couples constituent elements in the computer system 2200 to each other.

In the present embodiment, it is assumed that an application program is stored in the storage medium 2250 by the deployment program 1500 and is loaded to the memory 2240 and is executed by the processor 2220 during execution. However, the present invention is not limited thereto, and a part or an entire portion of the application may be executed on the storage medium 2250. Moreover, the storage medium 2250 may be a nonvolatile medium such as, for example, an HDD (Hard Disk Drive) or an SSD (Solid State Drive), and the memory 2240 may be a volatile medium such as a DRAM (Dynamic RAM), for example. However, when the computer system 2200 does not include the memory 2240, all programs may be executed on the storage medium 2250 and management tables may be read and written. Moreover, the application program may be executed in a hypervisor-type virtualization environment constructed on the physical computers 2200 and 2201 and may be executed in a container-type virtualization environment.

The management computer system 2100 includes a processor 2120, an I/O device 2130, a memory 2140, a storage medium 2150, a management I/F 2160, and an internal network 2170. The I/O device 2130 may be a device that accepts input and output of users such as a keyboard, a mouse, or a display. The management I/F 2160 is an I/F with the management network 2400. The internal network 2170 is a network that couples constituent elements in the computer system 2100 to each other.

The data network 2300 is a network for coupling a plurality of computer systems 2200 and 2201 and transmitting and receiving data between the systems. The management network 2400 is a network for coupling the plurality of computer systems 2200 and 2201 and the management computers 2100 and 2101 and transmitting and receiving data between the system and the computers. In the present embodiment, although the data network 2300 and the management network 2400 are separate networks, the networks may be the same network. Moreover, these networks may be Ethernet, for example, but another form may be used without being limited thereto.

Figure 3:
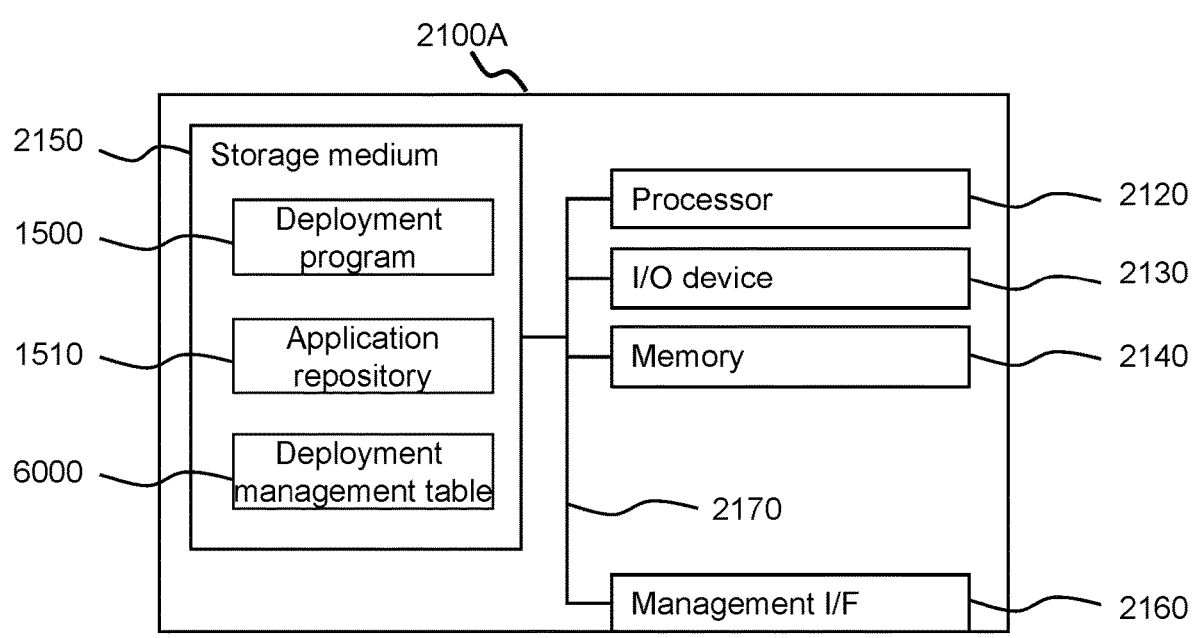
FIG. 3 is a diagram illustrating a configuration of a management computer system 2200A in which a deployment program 1500 operates in an embodiment of the present invention.
Figure 4:
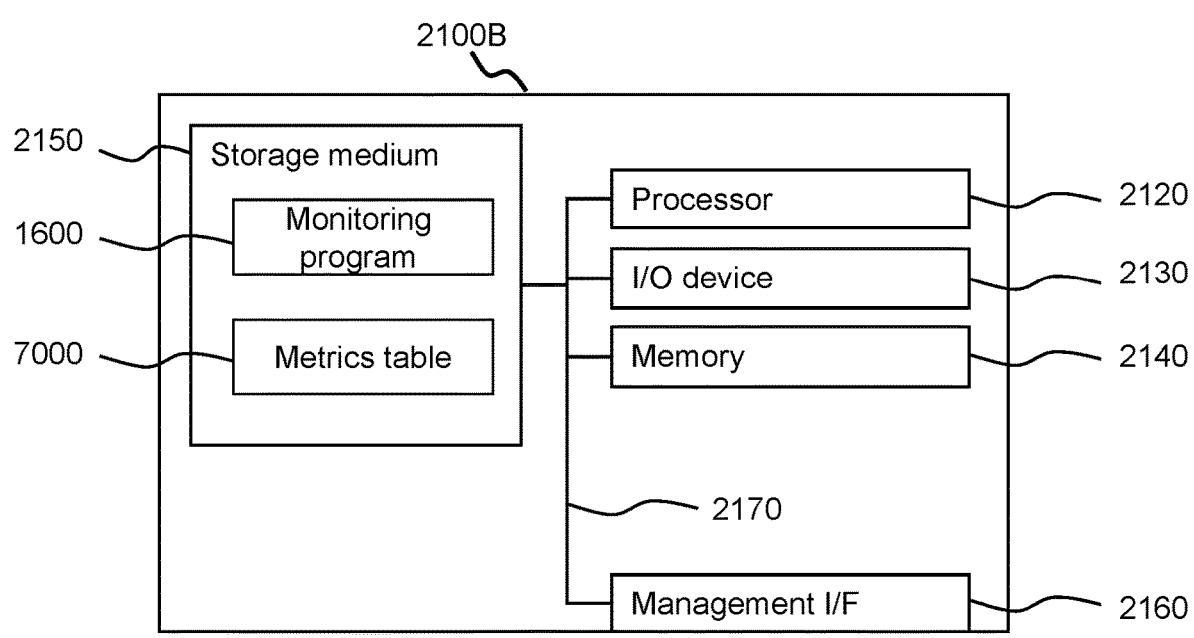
FIG. 4 is a diagram illustrating a configuration of a management computer system 2200B in which a monitoring program 1600 operates in an embodiment of the present invention.
Figure 5:
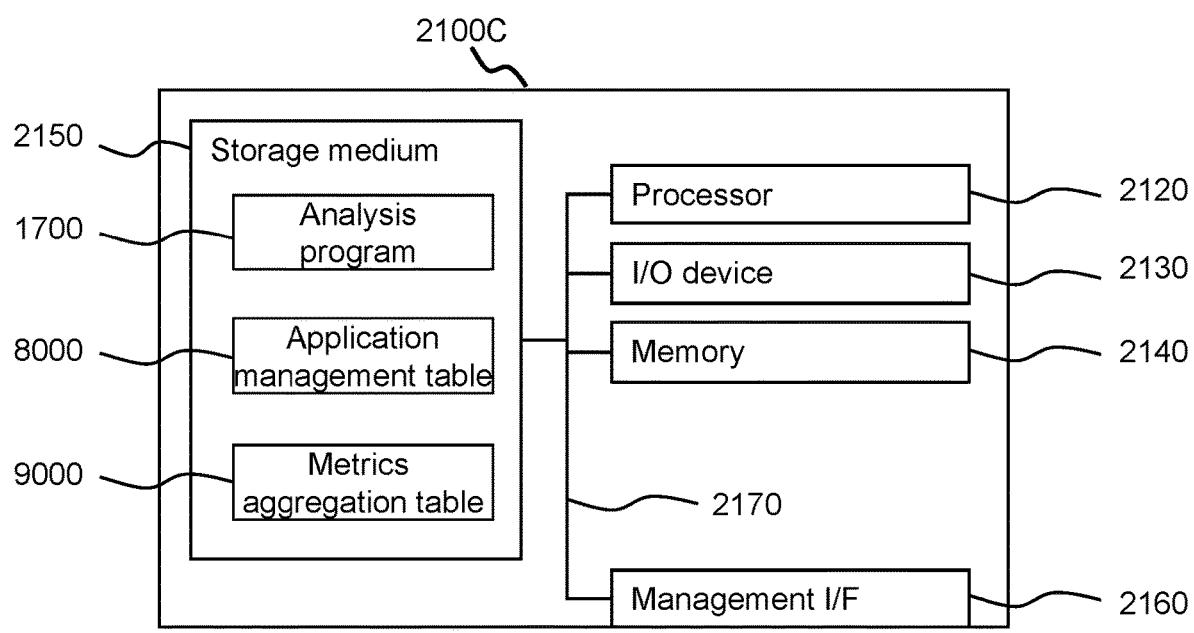
FIG. 5 is a diagram illustrating a configuration of a management computer system 2200C in which an analysis program 1700 operates in an embodiment of the present invention.

FIGS. 3, 4, and 5 are diagrams respectively illustrating a configuration of a management computer 2100A on which the deployment program 1500 operates, a configuration of a management computer 2100B on which the monitoring program 1600 operates, and a configuration of a management computer 2100C on which the analysis program 1700 operates.

The management computers 2100A to 2100C each include a processor 2120, an I/O device 2130, a memory 2140, a storage medium 2150, a management I/F 2160, and an internal network 2170. The management computers 2100A, 2100B, and 2100C may be a physical computer itself. Alternatively, the present invention may be implemented in a hypervisor-type virtualization environment constructed in a physical computer and may be implemented in a container-type virtualization environment.

FIG. 3 is a diagram illustrating a configuration of the management computer 2100A on which the deployment program 1500 operates according to the embodiment of the present invention.

The management computer 2100A includes a storage medium 2150. The deployment program 1500, an application repository 1510, and a deployment management table 6000 are stored in the storage medium 2150.

In the present embodiment, it is assumed that the deployment program 1500 stored in the storage medium 2150 is loaded to the memory 2140 and is executed by the processor 2120 during execution. However, the present invention is not limited thereto, and a part or an entire portion of the application may be executed on the storage medium 2150. Moreover, in the present embodiment, the storage medium 2150 may be a nonvolatile medium such as HDD or SSD, and the memory 2140 may be a volatile medium such as DRAM. However, when the management computer 2100A does not include the memory 2140, all programs may be executed on the storage medium 2150, and management tables may be read and written.

The application repository 1510 and the deployment management table 6000 may be stored in another management computer. Moreover, the deployment program 1500 may operate on the same management computer as the management computer on which the monitoring program 1600 or the analysis program 1700 operates to be described later. FIG. 4 is a diagram illustrating a configuration of a management computer 2100B on which the monitoring program 1600 operates according to the embodiment of the present invention.

The monitoring program 1600 and a metric table 7000 are stored in the storage medium 2150.

In the present embodiment, it is assumed that the monitoring program 1600 stored in the storage medium 2150 is loaded to the memory 2140 and is executed by the processor 2120 during execution. However, the present invention is not limited thereto, and a part or an entire portion of the monitoring program 1600 may be executed on the storage medium 2150. Moreover, in the present embodiment, the storage medium 2150 may be a nonvolatile medium such as HDD or SSD, and the memory 2140 may be a volatile medium such as DRAM. However, when the management computer 2100B does not include the memory 2140, all programs may be executed on the storage medium 2150, and management tables may be read and written.

FIG. 5 is a diagram illustrating a configuration of a management computer 2100C on which the analysis program 1700 operates according to the embodiment of the present invention.

The management computer 2100C includes a storage medium 2150. The analysis program 1700, an application management table 8000, and a metric aggregation table 9000 are stored in the storage medium 2150.

In the present embodiment, it is assumed that the analysis program 1700 stored in the storage medium 2150 is loaded to the memory 2140 and is executed by the processor 2120 during execution. However, the present invention is not limited thereto, and a part or an entire portion of the analysis program 1700 may be executed on the storage medium 2150. Moreover, in the present embodiment, the storage medium 2150 may be a nonvolatile medium such as HDD or SSD, and the memory 2140 may be a volatile medium such as DRAM. However, when the management computer 2100C does not include the memory 2140, all programs may be executed on the storage medium 2150, and management tables may be read and written.

FIG. 6 is an example of a diagram illustrating a configuration of the deployment management table 6000 stored in the storage medium 2250 of the computer system 2200A according to the embodiment of the present invention. The deployment management table 6000 correlates an application version and a computer on which an application of each version is deployed. The deployment management table 6000 is updated by the deployment program 1500. For example, when the deployment program 1500 performs deployment, the details of the deployment are applied to the deployment management table 6000.

As illustrated in the drawing, the deployment management table 6000 includes an application column 6110, a version column 6120, and a deployment destination column 6130.

The type of a deployed application is stored in the application column 6110.

The version of a deployed application is stored in the version column 6120. There may be a case in which a value such as a hash value from which it is difficult to distinguish new and old versions is stored as the version. The value is, for example, 35df9. In this case, the application management table 8000 may manage a commitment date on which an application was stored in the application repository 1510, and an application of the new commitment date may be regarded as a new version.

An identifier for identifying a computer on which an application is deployed is stored in the deployment destination column 6130. The identifier may be an IP address or a host name, for example, and other identifiers may be used. Moreover, a deployment destination computer may be a physical computer or a logical computer.

Rows 6010 to 6050 indicate information on a deployed application. For example, row 6010 indicates that an application having the name of Application A and the version number of Ver. 1 is deployed to four deployment destination computers.

In the example of FIG. 6, the number of deployment destinations is two or four. However, the number of deployment destinations is not limited thereto but may be an arbitrary number of one or more.

FIG. 7 is an example of a diagram illustrating a configuration of the metric table 7000 stored in the storage medium 2250 of the computer system 2200B according to the embodiment of the present invention. The metric table 7000 stores measurement values of the metrics acquired by the monitoring program 1600.

The metric table 7000 includes an acquisition source column 7210, a type column 7220, and a metric column 7230.

An identifier of a computer that has acquired the measurement values of metrics is stored in the acquisition source column 7210.

A metric type is stored in the type column 7220.

The measurement values of the metrics acquired by the monitoring program 1600 are stored in the metric column 7230. A time point at which each measurement value was acquired may be stored in the top row of the metric column 7230. The metric table 7000 includes one or more metric columns 7230. Measurement values of the metrics measured at different time points may be stored in the respective metric columns 7230.

Rows 7010 to 7110 are metric data. For example, row 7010 indicates that the values of metric of the type of CPU usage were measured from an acquisition source of 192.168.1.1 and the measurement values were 60 on the date and time of 2/10 9:30 and were 53 on the date and time of 2/10 9:42.

In the present embodiment, it is assumed that all metrics are acquired collectively at the same time point. However, a method of acquiring metrics is not limited thereto. For example, respective metrics may be acquired individually and the acquired values may be stored in the metric columns together with the acquisition time points.

FIG. 8 is an example of a diagram illustrating a configuration of the application management table 8000 stored in the storage medium 2250 of the computer system 2200C according to the embodiment of the present invention. The application management table 8000 correlates an application version with a computer on which an application of each version operates. Since the application management table 8000 is similar to the deployment management table 6000, a difference between them will be mainly described.

As illustrated in the drawing, the application management table 8000 includes an application column 8110, a version column 8120, and a deployment destination column 8130. The information stored in the deployment management table 6000 may be copied to the columns 8110 to 8130.

Rows 8030 and 8035 of the version column 8120 store information different from that of the deployment management table 6000. That is, the version column 8120 may further include information on a feature flag. The feature flag (sometimes referred to as a feature toggle) is a flag indicating whether a specific function of an application program is valid or not. For example, when an API or a CLI activates (ON) or deactivates (OFF) a new function added to an application program from the outside, the feature flag indicates a present state (ON/OFF) of the new function.

Therefore, when the feature flag is set to a certain application, whether the new function of the application is valid or not is not determined at the time of deployment. Although both rows 8030 and 8035 store information on Application B of Ver. 25, the rows are different in that a new function called Feature A is invalid in row 8030 whereas a new function called Feature A is valid in row 8035.

Figure 9:
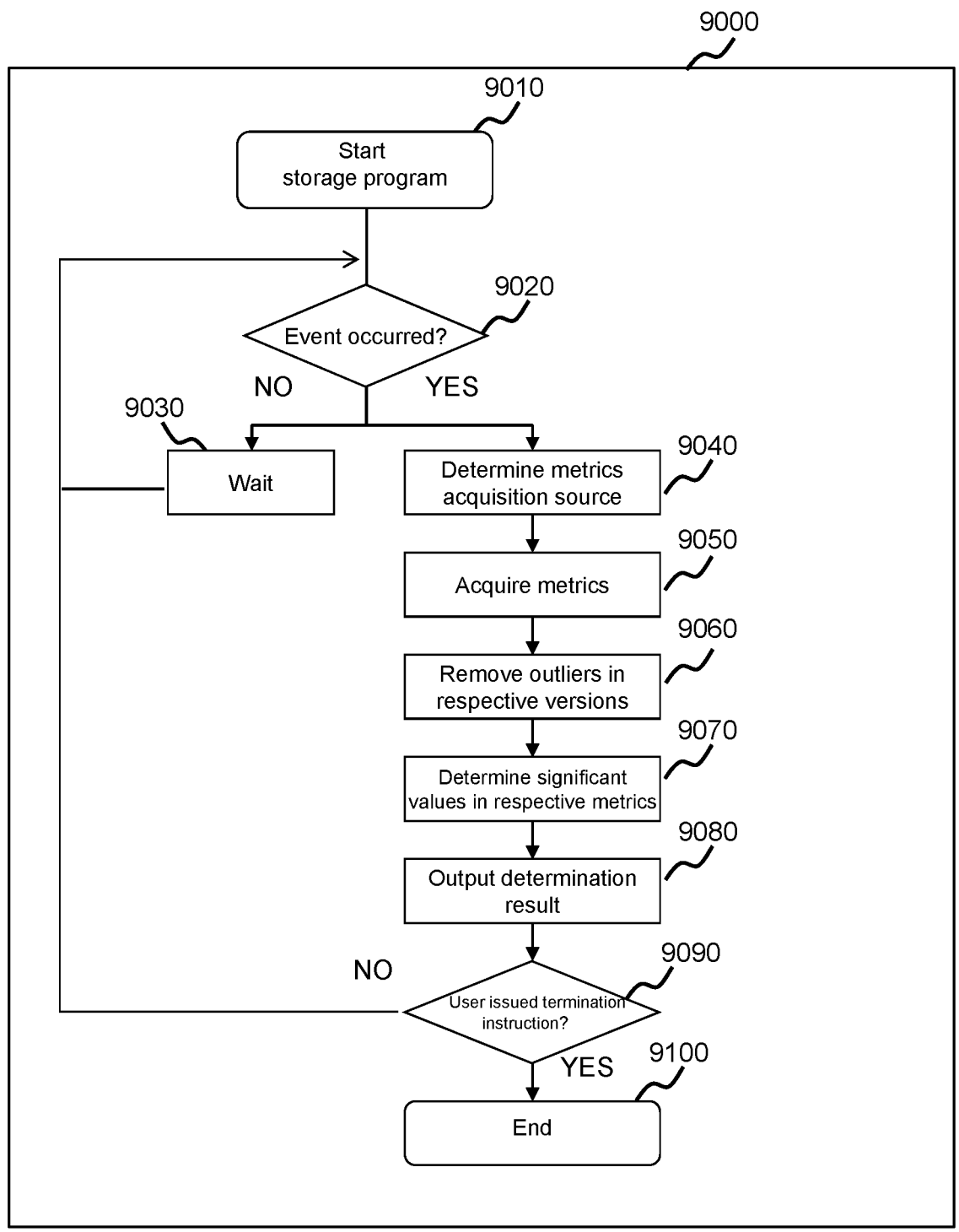
FIG. 9 is a flowchart illustrating a process flow of an analysis program 1700 of the computer system 2100C according to an embodiment of the present invention.

FIG. 9 is a flowchart illustrating a process flow of the analysis program. 1700 of the computer system 2200C according to the embodiment of the present invention. The analysis program 1700 is a program that compares measurement values of two versions on the basis of the measurement values of a plurality of metrics acquired from environments in which applications of two versions operate and extracts metrics where a significant difference is detected.

The analysis program 1700 of the present embodiment may be implemented as a resident program. For example, the analysis program 1700 may wait for arrival of an event to perform an appropriate process according to the type of an arrived event and may be implemented in another form. For example, the analysis program 1700 may execute this process periodically rather than executing the process according to an event in an on-demand manner.

In step 9010, a program starts performing operations. In step 9020, the analysis program 1700 determines whether an event has occurred. Here, the event may be deployment of a new application, for example. The analysis program 1700 may detect occurrence of an event in response to a notification from the deployment program 1500, and the analysis program 1700 may detect polling in the deployment program 1500 as occurrence of an event. Moreover, the analysis program 1700 may detect setting ON of the feature flag in the application management table 8000 as an event. Furthermore, a specific input from the outside such as a request from an application developer may be regarded as an event.

When an event is not detected in step 9020, the process waits for a predetermined time in step 9030, and the flow returns to step 9020.

When an event such as deployment of a new application, for example, is detected in step 9020, the analysis program 1700 determines an acquisition source of metrics in step 9040. In this step, the acquisition sources of a plurality of metrics corresponding to a plurality of versions of applications to be compared.

First, when deployment is detected in step 9020, the analysis program 1700 adds information on an application related to the deployment to the application management table 8000. For example, the analysis program 1700 adds the name of a newly deployed application to the application column 8110, the version thereof to the version column 8120, and the deployment destination thereof to the deployment destination column 8130 as new rows. Here, the deployment destination of the application stored in the deployment destination column 8130 is a first acquisition source of the metrics.

Subsequently, the analysis program 1700 determines a comparison target application and the version thereof. For example, the analysis program 1700 may specify an application the same as the application of which the deployment has been detected in step 9020 and a version (for example, a previous version) older than the version of which the deployment has been detected in step 9020 by referring to the application management table 8000. For example, when the application and the version detected in step 9020 are Application A and Ver. 2, the previous version of the application to be compared therewith is determined as Ver. 1 by referring to the application management table 8000. A deployment destination of the application of the comparison target version is a second acquisition source of the metrics.

In step 9050, the analysis program 1700 acquires one or more measurement values for each of a plurality of types of metrics from the acquisition sources of the metrics determined in step 9040 and stores the acquired measurement values in the metric aggregation table 9000. The metric aggregation table 9000 has the same configuration as the metric table 7000 and may have an acquisition source column, a type column, and a metric column. The metrics may be collected for a predetermined period and the metrics may be collected only once.

The metric types acquired in step 9050 may be limited. For example, if the number of metric types increases too much and the frequency of deployment increases too much, a computation amount increases if the presence of a significant difference is determined for all metric types whenever deployment is detected. As a result, a computation load issue may occur. Therefore, a priority order may be assigned to a metric type that the analysis program 1700 acquires in step 9050, and measurement values may be acquired for a predetermined number of metric types having higher priority orders. For example, the priority order of a metric type in which it was determined in the past that a significant difference was detected may be increased. For example, measurement values may be acquired for metric types (for example, N high-ranking types) in which the number of times it was determined in the past that a significant difference was detected is on a higher rank. Here, N may be a fixed value and may be determined by an administrator. Alternatively, the priority order of metric types may be designated by the administrator.

In this manner, it is possible to reduce a computation amount by limiting metric types subjected to significant difference determination.

Whether significant difference determination will be performed on all metric types or some metric types may be switched depending on time or conditions.

In step 9060, the analysis program 1700 removes outliers from the measurement values of the metrics acquired in step 9050. Determination on whether measurement values are outliers or not may be performed for respective versions and respective metric types.

For example, using a plurality of measurement values of each metric type as one population, the analysis program 1700 performs a test (a normality test) as to whether pieces of data of each population follow a normal distribution. Examples of a normality test method include Anderson-Darling test, D'Agostino-Pearson test, Kolmogorov-Smirnov test, Shapiro-Wilk test, and Jarque-Bera test. When a population has normality, values that deviate a 95%-confidence interval (mean±2 SD) may be regarded as outliers. When a population does not have normality, outliers may be defined using the median and the IQR (interquartile range). The smaller outliers may be the first quartile −1.5*IQR or smaller, and the larger outliers may be the third quartile +1.5*IQR. However, the present invention is not limited thereto, and outliers may be removed by other methods.

In step 9070, the presence of a significant difference between versions is determined for a group of measurement values of a plurality of metric types from which outliers are removed.

Before significant difference test is performed, the analysis program 1700 may perform a test (a normality test) as to whether pieces of data of each population follow a normal distribution. The result of the normality test performed in step 9060 may be used in this step. The analysis program 1700 performs the t-test, for example, when pieces of data of each population has normality, and performs the Mann-Whitney U-test or sign test which is a non-parametric test, for example, when pieces of data of each population does not have normality. However, a significant difference determination method is not limited to these methods and may be performed by other methods.

By these tests, it is possible to test whether a significant difference is present. When testing the significant difference, an administrator or the like may designate a significance level (a risk level). The significance level is a likelihood of misjudgment that a significant difference is detected although there is no significant difference. For example, when p=0.05, it is misjudged with a probability of 5% that a significant difference is detected although there is no significant difference. Due to this, a value as small as p=0.01 may be designated if it is desired to decrease misjudgment and a value as large as p=0.1 may be designated when it is desired to extract metrics in which it is likely that a significant difference is detected even if there is misjudgment.

In step 9080, the metric types in which it is determined in step 9070 that the significant difference is detected is output to an analysis result display GUI 10000 illustrated in FIG. 10.

The analysis result display GUI 10000 will be described later. A display method is not limited to the method illustrated in FIG. 10, and other methods may be used.

A method of using the significant difference determination result is not limited to the display method. For example, the determination result may be transmitted by a program such as an email program or a chatting program and the determination result may be used in other programs that execute countermeasures.

In step 9090, it is checked whether a user has issued a termination instruction. When the termination instruction is not received, the flow returns to step 9020. When the termination instruction is received, the flow ends at step 9100.

In the present embodiment, a process of detecting a metric type in which the significant difference is detected between two versions has been described. However, three or more versions may be compared.

For example, a multiple comparison test may be used to detect the presence of the significant difference in metrics of a plurality of versions.

FIG. 10 is an example of an analysis result display screen 10000 that the analysis program 1700 displays in the computer system 2200C according to the embodiment of the present invention.

The analysis result display screen 10000 includes an analysis date/time field 10010, an application field 10020, an old version field 10030, a new version field 10040, a significance level field 10050, and a metric field 10060 where significant difference was detected.

The analysis date/time field 10010 displays the date and time which analysis was performed.

The application field 10020 displays the name of an analysis target application.

The old version field 10030 displays an identifier for identifying the oldest version of the versions of an analysis target application.

The new version field 10040 displays an identifier for identifying the newest version of the versions of the analysis target application.

The significance level field 10050 displays a significance level used for significant difference determination.

The metric field 10060 where significant difference was detected is a table illustrating a list of metrics in which it is determined that the significant difference was detected.

The metric field 10060 where significant difference was detected includes a metric column 10140, a p-value column 10150, mean columns 10160 and 10170, and dispersion columns 10180 and 10190.

The metric column 10140 displays metrics in which it is determined that the significant difference was detected.

The p-value column 10150 displays a p-value. The p-value is a probability that a null hypothesis that there is no difference between two groups is satisfied.

The mean columns 10160 and 10170 display means of the metrics of the respective versions.

The dispersion columns 10180 and 10190 display dispersions of the metrics of the respective versions.

Rows 10110 to 10130 are metrics in which it is detected that the significant difference was detected. For example, row 10110 indicates that there is the significant difference in CPU usage of Application C of the versions Ver. 5.0 and Ver. 5.1. The p-value of 0.025 indicates that the probability that there is no significant difference in CPU usage of two versions is 2.5% and a probability that there is the significant difference is 97.5%. Moreover, the mean and the dispersion of CPU usage of each of versions are also displayed.

This screen disappears when an OK button 10200 is pressed.

In the present embodiment, the analysis results are displayed using statistical information such as mean and dispersion as the information on the metrics where the significant difference was detected. However, the present invention is not limited thereto. For example, the graph of respective metrics in a period used for determination may be displayed.

REFERENCE SIGNS LIST

1000 Logical configuration of IT system
1101 Application program
1201 Application program
1500 Deployment program
1600 Monitoring program
1700 Analysis program
2000 Physical configuration of IT system

The invention claimed is:

1. An application management system that comprises:
   a storage device; and
   at least one processor that
      monitors measurement values of a plurality of metric types for a plurality of versions of an application executing on one or more computers, wherein the plurality of versions comprises a first version and a second version, and
      analyzes the monitored measurement values to identify one or more of the plurality of metric types in which a difference occurs between the first version and the second version of the application.

2. The application management system according to claim 1, wherein identifying the one or more metric types in which a difference occurs comprises performing a significant difference test on the measurement values of each of at least a subset of the plurality of metric types for the first version and the second version of the application to select one or more metric types, in which a significant difference is present in the measurement values between the first version and the second version of the application, as the identified one or more metric types.

3. The application management system according to claim 2, wherein the at least one processor is configured to only perform the significant difference test for each of a predetermined number of the plurality of metric types having a higher priority order according to a priority order determined for the plurality of metric types.

4. The application management system according to claim 3, wherein the priority order of each of the plurality of metric types is determined based on a number of times that each metric type was previously selected as having a significant difference in measurement values between different versions of the application.

5. The application management system according to claim 2, wherein the at least one processor is further configured to remove outliers from the measurement values of the plurality of metric types according to one or more predetermined criteria, prior to analyzing the monitored measurement values to identify the one or more metric types.

6. The application management system according to claim 1, wherein the at least one processor is further configured to output a result of the analysis on a screen, or issue a notification of the result by an application programming interface (API).

7. The application management system according to claim 1, wherein the at least one processor is configured to initiate monitoring and analysis of the measurement values between the first and second versions of the application when the second version of the application is deployed.

8. A method performed by an application management system that includes at least one processor, wherein the at least one processor executes a predetermined program to:
   monitor measurement values of a plurality of metric types for a plurality of versions of an application executing on one or more computers, wherein the plurality of versions comprises a first version and a second version; and
   analyze the monitored measurement values to identify one or more of the plurality of metric types in which a difference occurs between the first version and the second version of the application.

9. A non-transitory computer-readable medium having a computer program stored thereon, wherein the computer program, when executed by a processor, causes the processor to:
   monitor measurement values of a plurality of metric types for a plurality of versions of an application executing on one or more computers, wherein the plurality of versions comprises a first version and a second version; and
   analyze the monitored measurement values to identify one or more of the plurality of metric types in which a difference occurs between the first version and the second version of the application.

10. The application management system according to claim 1, wherein the plurality of metric types comprises at least one resource usage.

11. The application management system according to claim 10, wherein the at least one resource usage comprises a central processing unit (CPU) usage.

12. The application management system according to claim 10, wherein the at least one resource usage comprises a memory usage.

13. The application management system according to claim 10, wherein the at least one resource usage comprises a network usage.

14. The application management system according to claim 10, wherein the at least one resource usage comprises a disk usage.

15. The application management system according to claim 1, wherein the plurality of metric types comprises a latency.

16. The application management system according to claim 1, wherein the plurality of metric types comprises a hit rate.

17. The application management system according to claim 1, wherein the plurality of metric types comprises a transaction rate.

18. The application management system according to claim 1, wherein the plurality of metric types comprises input/output operations per second (TOPS).

* * * * *